June 13, 1967 D. W. ROPER 3,324,744
SLIP LIMITING DIFFERENTIAL
Filed Feb. 10, 1965 2 Sheets-Sheet 1

INVENTOR.
DANIEL W. ROPER
BY
*Hoffmann and Yount*
ATTORNEYS

INVENTOR.
BY DANIEL W. ROPER
Hoffmann and Yount
ATTORNEYS

United States Patent Office 3,324,744
Patented June 13, 1967

3,324,744
SLIP LIMITING DIFFERENTIAL
Daniel W. Roper, Rochester, Mich., assignor to Eaton Yale & Towne Inc., a corporation of Ohio
Filed Feb. 10, 1965, Ser. No. 431,519
14 Claims. (Cl. 74—711)

The present invention relates to a drive mechanism and, particularly, to a differential drive mechanism commonly known as a limited slip differential and which includes at least one differential side gear drivingly connected to an output member and a rotatable planet carrier rotatably carrying a planetary gear in mesh with the side gear and a clutch means to retard rotation of the side gear relative to the planet carrier above a predetermined degree.

The principal object of the present invention is the provision of a new and improved differential drive mechanism of the limited slip type which includes drive transmitting elements which act between spaced surfaces rotatable with the side gear and the planet carrier, respectively, and which elements are movable transversely of the axis of rotation of the side gear and the planet carrier and are effective to wedgingly engage in a cooperative driving member with the surfaces so as to prevent relative rotation thereof.

A further object of the present invention is the provision of a new and improved limited slip differential mechanism having a long life and efficient operation and wherein the clutch mechanism for drivingly connecting the side gear and the planet carrier is a roller-type clutch having roller elements which move transverse to the axis of rotation of the side gear and the planet carrier and effect a wedging engagement between radially spaced surfaces rotatable with the side gear and the planet carrier to drivingly interconnect the planet carrier and the side gear.

A still further object of the present invention is the provision of a new and improved limited slip differential drive mechanism incorporating a roller-type clutch for drivingly connecting the side gear with the planet carrier and wherein the clutch mechanism includes a plurality of rollers supported in a roller cage yieldably held so that the rollers are in a nondriving position and is moved so that the rollers move into driving relationship with the surfaces rotatable with the side gear and planet carrier by the operation of a viscous coupling means for effecting shifting of the roller cage against the means yieldably holding it.

Another object of the present invention is the provision of a new and improved drive mechanism having a roller clutch for drivingly connecting relatively rotatable drive members and including a roller cage and a plurality of drive transmitting roller elements in the roller cage and movable therewith and wherein the roller cage is biased to a nondriving position by spring means which cooperates with a roller detent member carried by the roller cage and having a stem portion encircled by a torsion spring, with the opposite ends of the spring engaging opposite portions of the roller cage and biasing the roller into a detent or recess in a surface rotatable with one drive member.

Still another object of the present invention is the provision of a new and improved drive mechanism wherein a means for holding the roller cage in a nondriving position includes a spring detent arrangement including a detent pin slidably carried by the roller edge and biased by a spring into a detent rotatable with one relatively rotatable member and wherein the spring tends to hold the pin in the detent and movement of the roller cage into driving position occurs only after the force tending to move the roller cage overcomes the spring force holding the pin in the detent.

Further objects and advantages of the present invention will be apparent to those skilled in the art to which it relates from the following detailed description of the preferred embodiment thereof made with reference to the accompanying drawings forming a part of this specification and wherein.

The present invention provides a new and improved drive mechanism having relatively rotatable members and clutch means for drivingly connecting the members in response to relative rotation therebetween. In particular, the present invention provides a new and improved limited slip differential having a clutch means to retard relative rotation of a side gear and planet carrier thereof.

Figure 1:
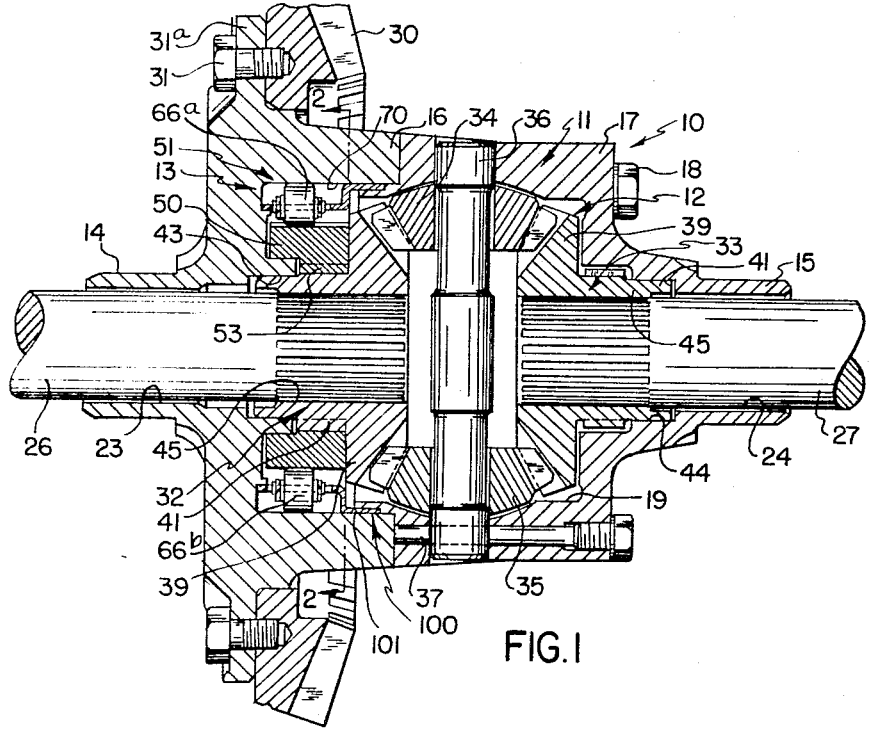
FIG. 1 is an axial sectional view taken through a drive mechanism embodying the present invention.

As representing the preferred embodiment of the present invention, a differential drive mechanism 10 is illustrated in FIG. 1 and is especially suitable for use in driving the wheels of a vehicle. The differential drive mechanism 10 comprises, in general, a rotatable planet gear carrier 11, a differential gear train 12, and a clutch mechanism 13 operable to retard rotation of one of the gears of the gear train 12 relative to the planet gear carrier 11.

The planet gear carrier 11 includes a pair of support portions 14 and 15 adapted to be received in bearings of a supporting structure, such as an axle housing, not shown, by which the carrier 11 is rotatably supported. The carrier 11 includes a pair of members 16 and 17 which are suitably secured together by means of suitable screws 18, and which define a chamber 19 in which the gear train 12 and the clutch means 13 are located. The support portions 14, 15 of the planet gear carrier 11 are formed on opposite portions of the members 16, 17, respectively, and are provided with openings 23, 24, respectively, extending therethrough. The openings 23, 24 are disposed in an aligned relation on a common axis which is also the rotational axis of the carrier 11. The axial openings 23, 24 communicate with the chamber 19 and receive or accommodate the driven or power output means which are here represented by axle shafts, 26, 27, respectively, whose outer ends are connected with traction wheels, or the like, not shown, and whose inner or adjacent ends are connected with the gear train 12, as will be described hereinbelow.

The differential mechanism 10 includes a conventional ring gear 30 extending around and mounted on the carrier 11 by means of connecting screws 31 which extend through a flange portion 32 of the member 16 which forms a part of the planet carrier 11. A suitable drive pinion, not shown, meshes with the ring gear 30 and represents the power input means for the differential mechanism 10 and upon rotation effects rotation of the ring gear 30, and rotation of the ring gear 30, of course, effects rotation of the planet carrier 11.

The gear train 12 is operable to transmit the rotary motion of the planet carrier 11 to the output shafts 26, 27. The gear train 12 comprises a pair of beveled type side gears 32, 33, and a group of beveled pinion planetary gears, in this case two such gears, 34, 35 disposed between and in meshed engagement with the side gears 32, 33 for drivingly connecting the latter. The planetary gears 34, 35 are rotatably supported by the carrier 11 by means of a pinion shaft 36 extending across the gear chamber 19 and secured in the casing by a suitable anchor pin 37 extending through the pinion shaft transversely thereof.

The side gears 32, 33 and the pinion gears 34, 35 are, in the preferred embodiment, all bevel gears of conventional form as far as the teeth thereof are concerned, and the tooth profiles are of a conventional shape having pressure angle values coming within the usual range of such values. The side gears 32, 33, while, in the preferred embodiment, comprise bevel gears, may take other known forms and each of the gears 32, 33 comprises an annular body 39 having teeth formed thereon and a central hollow sleeve or hub 41 connected with the body and extending coaxially with the axis of rotation of the side gears. The carrier 11 is provided with hollow annular or axial sockets 43, 44 into which the hub portions 41 of the gears 32, 33, respectively, extend and which rotatably receive the gears. The gears 32, 33 are provided with splines 45 in the hub openings thereof which are engaged by corresponding splines formed on the inner ends of the axle shafts 26, 27, respectively for drivingly connecting said shaft with the side gears.

The clutch means 13 is operable to retard relative rotation of the side gear 32 with respect to the planet carrier 11. The clutch means 13 is a double overrunning clutch. The clutch means 13 acts between the planet carrier and a member 50 drivingly connected with the side gear 32. The member 50 comprises an annular sleeve member which has an opening therethrough and is internally splined at 53 and supported on the hub portion 41 of the gear 32 with the splines 53 thereof cooperating with splines on the outer portion of the hub 41 of the gear 32. The member 50, as a result of its spline connection to the hub portion 41 of the gear 32, rotates with the gear 32. The outer surface of the member 50 includes a plurality of substantially flat surface areas 60 extending therearound and at diametrically opposite portions thereof has grooves 61 and 62 formed therein. The grooves 61 and 62 are V-shaped grooves of only a slight depth.

The clutch means 13 includes a roller cage mechanism 51 which comprises a shiftable roller cage 65 and a plurality of rollers 66 supported by the shiftable roller cage 65 and corresponding in number to the number of flat surface areas on the member 50 plus the number of grooves 61, 62. The rollers 66 are located in openings in the roller cage and upon shifting movement of the roller cage, the rollers, of course, move with the roller cage. The rollers 66 engage the surface areas 60 of the member 50 and two rollers, namely, 66a and 66b, are located in the V-grooves 61, 62, respectively.

Figure 2:
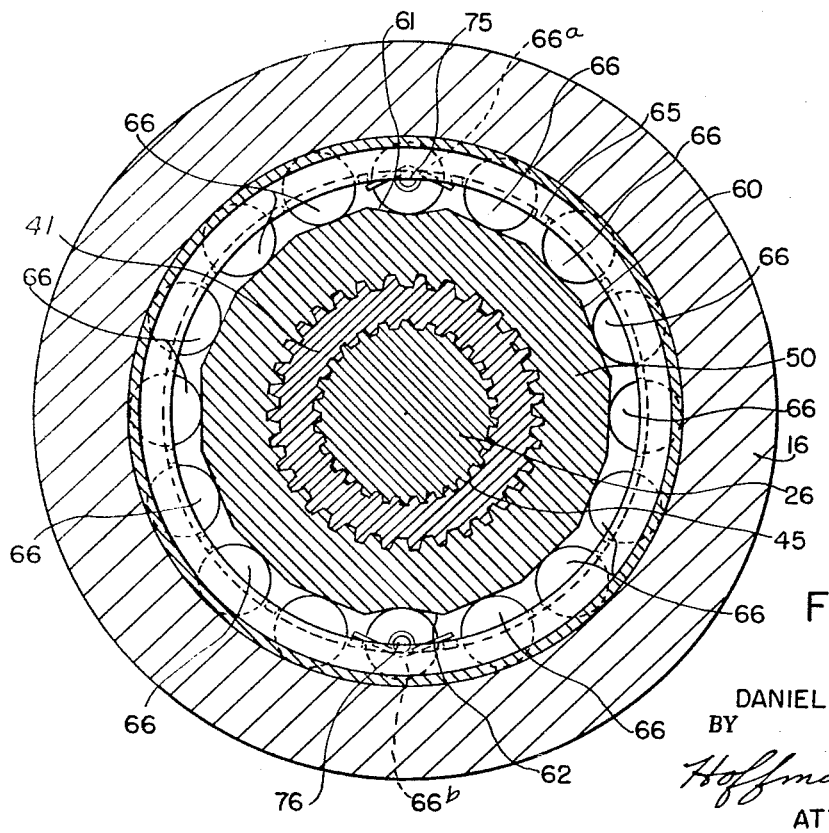
FIG. 2 is a transverse sectional view of the mechanism of FIG. 1, taken approximately along the section line 2—2 of FIG. 1.

The roller cage 65 is shiftable or movable, as noted above, from a position shown in FIG. 2 wherein the rollers 66 permit free-wheeling of the side gear and planet carrier 11 to a position wherein the rollers 66 wedgingly engage surface areas 60 of the member 50 and the arcuate surface 70 of the differential housing member 16 and when the rollers are wedgingly engaged with these surfaces, the planet carrier 11 is drivingly connected to the sleeve member 50 which, in turn, is drivingly connected to the side gear 32, and in this position relative movement of the side gear 32 and the carrier 11 is prevented.

Figure 3:
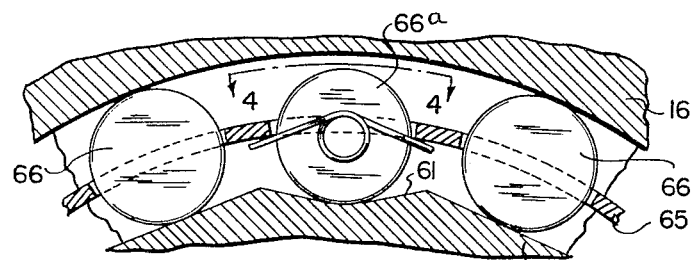
FIG. 3 is a fragmentary sectional view of a portion of the mechanism shown in FIG. 1.
Figure 4:
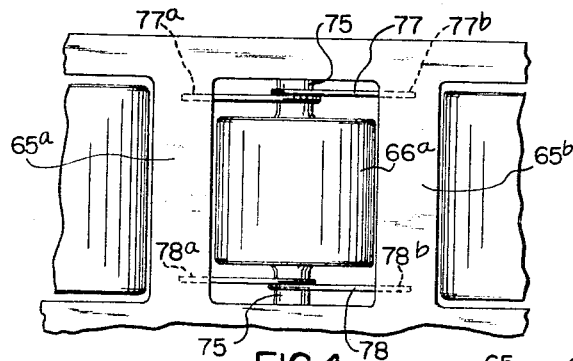
FIG. 4 is a fragmentary view of a portion of the mechanism shown in FIG. 3, taken along the line 4—4 of FIG. 3.

A suitable means is provided for yieldably holding the roller cage 51 in a centered or neutral position, and in the embodiment shown in FIGS. 1–4 a biasing means is provided for biasing the rollers 66 and the roller cage 65 into a centered or neutral position wherein the rollers 66 are not drivingly connecting the carrier 11 and the side gear 32. The biasing means may take different forms, but as shown in FIG. 3, includes a spring detent roller arrangement which includes the rollers 66a and 66b. The rollers 66a, 66b include stem portions 75. The stem portions 75 extend axially outwardly of the rollers 66a and 66b, respectively, as best shown with respect to roller 66a in FIG. 4. Encircling the opposite stem portions 75 are spring members 77, 78, respectively. The spring members encircle the opposite stem portions of the roller 66a and the opposite ends of the springs, namely, 77a and 77b, and 78a and 78b engage portions 65a, 65b of the roller cage intermediate the openings in the roller cage in which the roller 66a is located.

From the above description, it should be apparent that as the roller 66a tends to move out of the V-groove 61, the roller 66a tends to rise and one end of the springs 78, 77 will resist movement of the roller upwardly and tend to hold the roller in the bottom of the V-groove. Of course, once the force applied by the springs 77, 78 is overcome, the roller 66a will move upwardly out of the bottom of the V-groove and permit shifting of the roller cage 65 so that the rollers 66 carried thereby move into driving engagement with the surfaces 60 and 70 on the members 50 and 16, respectively. The rollers 66a and 66b do not transmit driving torque between the planet carrier 11 and the sleeve member 50.

From the above description, it should be apparent that the roller mechanism is biased into a centered position wherein it does not drivingly engage the member 50 and the differential gear casing 11. However, it may be moved into driving engagement against the bias of this spring, as described hereinabove. The means for moving the roller cage so that the rollers drivingly engage the surfaces 70 and 60 comprises a viscous coupling mechanism, generally designated 100. The viscous coupling mechanism 100 includes a portion 101 of the roller cage which extends axially of the side gear 32 and away from the rollers 66. The portion 101 of the roller cage extends into a small groove 102 formed in the planet carrier 11. A viscous fluid is located in the groove 102 and functions as a drive connection between the planet carrier 11 and the portion 101 of the roller cage. Upon a predetermined amount of relative rotation of the planet carrier 11 and the side gear 32 and sleeve member 50, the drive force applied by the shear fluid of the viscous coupling 100 overcomes the bias of the springs 77, 78 and effects shifting movement of the roller cage 51 due to the operation of the viscous coupling 100. This effects movement of the roller cage 51 and the rollers 66 carried thereby into driving engagement with the surfaces 70 and 60.

If the planet carrier 11 rotates relative to the side gear 32 as when the traction wheel connected with the output shaft 27 slips, the viscous coupling mechanism 100 operates to tend to drag the roller cage 51 in the direction of rotation of the planet carrier 11 and if the relative rotation is sufficient to overcome the biasing springs, the planet carrier 11 and side gear 32 will be locked together by the rollers 66. If the side gear 32 rotates relative to the carrier 11 as when the traction wheel which is connected to the output shaft 26 slips, the viscous coupling tends to maintain the roller cage 51 rotating at a speed which is a function of the speed of the carrier 11 and thus at a speed lower than that of the side gear 32 and sleeve member 50. As a result, the side gear rotates relative to the roller cage 51 and effects a drive connection between the planet carrier 11 and side gear 32 through the rollers 66. This drive connection again is effected only if the relative rotation between the planet carrier 11 and side gear is sufficient to provide a force overcoming the bias of the springs 77, 78.

Figure 7:
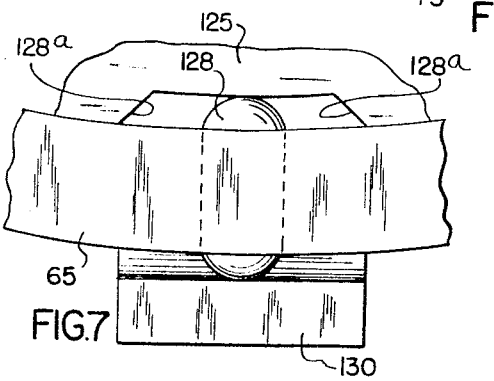
FIG. 7 is an enlarged fragmentary view of a portion of the drive mechanism shown in FIG. 6.
Figure 6:
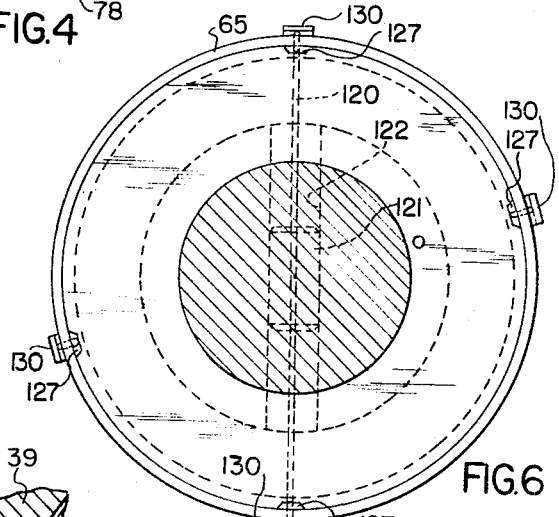
FIG. 6 is a transverse sectional view of the modified drive mechanism shown in FIG. 5.
Figure 5:
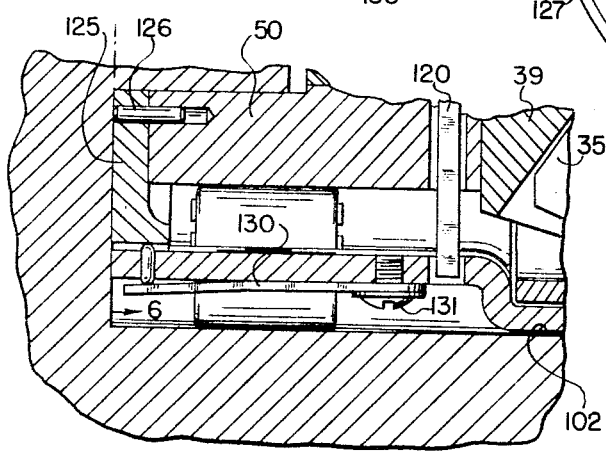
FIG. 5 is a fragmentary axial sectional view of a drive mechanism of modified construction and embodying the present invention.

The modification of the present invention shown in FIGS. 5–7 is similar in all respects to the structure shown in FIG. 1, with the exception of the mechanism for yieldably holding the roller cage in its neutral or non-driving position, and similar reference numerals will be used to designate corresponding parts. In the modification shown in FIGS. 5-7, the roller cage 65 is biased to its neutral position by means of a leaf spring 120 which is located in a block member 121 supported in a radial opening 122 in the side gear 32 and extending through the opening in the sleeve member 50. The leaf spring 120 has opposite end portions engaged in slots in the roller cage 65 and biases the roller cage 65 into its normal position and resists, to some degree, movement of the roller cage out of its normal position. The spring 120, however, is primarily a return spring for returning the roller cage 65 to its non-driving position after movement therefrom.

A suitable spring detent mechanism is included in the structure shown in FIGS. 5-7 to control the movement of the cage 65. The spring detent mechanism shown in FIGS. 5-7 includes a detent thrust washer 125 which is secured to the member 50 by means of a pin member 126 and rotates with the member 50 and thus rotates with the side gear 32. The outer surface of the thrust washer 125 has a plurality of recesses or notches 127 spaced therearound. A suitable pin member 128 extends through the roller cage 65 and is slidable therein and extends into engagement with the surface of the thrust washer 125 defining the notches 127. The end of the pin 128 opposite the end which engages the surface of the thrust washer 125 is engaged by a spring member 130 which biases the pin member 128 into engagement with the thrust washer and resists movement of the pin outwardly therefrom.

The spring member 130 comprises a leaf spring member which is connected at one end to the roller cage 65 by means of a screw. The other end of the leaf spring engages the pin 50. It should be apparent from the description hereinabove that as the side gear rotates relative to the roller cage due to the action of the viscous coupling 100, the pin members 128 move relative to the thrust washer and tend to move up the ramps 128a and 128b defining the notches 127 therein. When this occurs, the spring 130 resists movement of the pin members 128 outwardly. The movement of the roller cage 65 so as to effect engagement of the rollers 66 in driving relationship with the surfaces 60 and 70 is such that the pin members 128 must move up the rams 128a, or 128b, depending on the direction of relative movement of the members. Thus, the spring detent arrangement provides a force which must be overcome in order to effect wedging engagement of the roller 66 with the surfaces 70 and 60 to effect the driving engagement therebetween. When the force is overcome by the viscous coupling mechanism, the side gear 32 and planet carrier 11 are drivingly connected.

Figure 8:
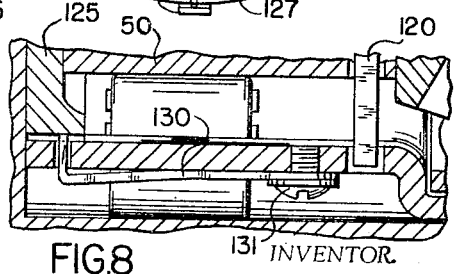
FIG. 8 is a sectional view of a drive mechanism of a still further modified construction and embodying the present invention.

The further modification of the present invention shown in FIG. 8 is similar to that shown in FIGS. 5-7 except that the pin members 128 and associated springs 130 are formed as an integral part. The outermost ends of the spring member 130 are bent at a 90° angle to the main extent of the pin members and extend through the roller cage into the notches in the thrust washer.

The present invention has been described hereinabove in considerable detail and it is to be understood that certain modifications, changes, and adaptations may be made therein, and it is hereby intended to cover all such modifications, changes, and adaptations coming within the scope of the appended claims.

Having described my invention, I claim:

1. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation thereof and a rotatable planet carrier drivingly connected with said input means and at least one planetary gear rotatably mounted on said planet carrier and meshing with said side gears to drive the same, and roller clutch means operable to drivingly connect said planet carrier to one of said side gears and including a roller cage movable transversely of the axis of rotation of said planet carrier and of said one of said side gears and relative thereto, drive transmitting roller elements located in said roller cage and between radially spaced drive surfaces rotatable with said planet carrier and said one of said side gears and movable upon movement of said roller cage, said roller elements having a first position out of driving cooperative engagement with said radially spaced surfaces and a second position in driving cooperative engagement with said radially spaced surfaces, yieldable means for holding said roller cage in a first position wherein said roller elements are in their said first position, and means for effecting movement of said roller cage to a second position wherein said roller elements are in their said second position in response to a predetermined amount of relative rotation between said planet carrier and said one of said side gears overcoming said yieldable means, said means for effecting movement of said roller cage in response to a predetermined amount of relative rotation between the planet carrier and the side gear comprising viscous shear coupling means including a portion of said roller cage extending into a slot formed in said planet carrier and the walls of which have an opposed space cooperative relationship with the surfaces of the portion of said roller carrier extending thereinto.

2. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation thereof and a rotatable planet carrier drivingly connected with said input means and at least one planetary gear rotatably mounted on said planet carrier and meshing with said side gears to drive the same, and roller clutch means operable to drivingly connect said planet carrier to one of said side gears and including a roller cage movable transversely of the axis of rotation of said planet carrier and of said one of said side gears and relative thereto, drive transmitting roller elements located in said roller cage and between radially spaced drive surfaces rotatable with said planet carrier and said one of said side gears and movable upon movement of said roller cage, said roller elements having a first position out of driving cooperative engagement with said radially spaced surfaces and a second position in driving cooperative engagement with said radially spaced surfaces, yieldable means for holding said roller cage in a first position wherein said roller elements are in their said first position, and means for effecting movement of said roller cage to a second position wherein said roller elements are in their said second position in response to a predetermined amount of relative rotation between said planet carrier and said one of said side gears overcoming said yieldable means, said yieldable means comprising at least one roller located at said roller cage and movable therewith, said roller being received in a recess formed in the radially spaced surface rotatable with said side gear and said spring means biasing said roller into said recess.

3. A drive mechanism as defined in claim 2 wherein said spring means comprises a torsion spring member encircling a stem of the roller and having its opposite end portions engaging portions of the roller cage on diametrically opposite sides of said roller.

4. A drive mechanism comprising rotatable power input means, first and second driven output means, differential gear means for driving said first and second driven output means from said input means and providing a differential action between said first and second driven output means, said differential gear means including first and second differential side gears drivingly connected to said first and second driven output means to effect rotation of said output means upon rotation thereof and a rotatable planet carrier drivingly connected with said input means and at least one planetary gear rotatably mounted on said planet carrier and meshing with said side gears to drive the same, and roller clutch means operable to drivingly connect said planet carrier to one of said side gears and including a roller cage movable transversely of the axis of rotation of said planet carrier and of said one of said side gears and relative thereto, drive transmitting roller elements located in said roller cage and between radially spaced drive surfaces rotatable with said planet carrier and said one of said side gears and movable upon movement of said roller cage, said roller elements having a first position out of driving cooperative engagement with said radially spaced surfaces and a second position in driving cooperative engagement with said radially spaced surfaces, yieldable means for holding said roller cage in a first position wherein said roller elements are in their said first position, and means for effecting movement of said roller cage to a second position wherein said roller elements are in their said second position in response to a predetermined amount of relative rotation between said planet carrier and said one of said side gears overcoming said yieldable means, said yieldable means comprising at least one detent pin carried by said roller cage and movable radially thereof, said detent pin extending into a detent notch in a washer member rotatable with said side gear, and means biasing said detent pin into said detent opening.

5. A drive mechanism as defined in claim 4 further including a further spring means acting on said roller cage to return said roller cage to its first position after movement to its said second position.

6. A drive mechanism comprising first and second members relatively rotatable about a common axis, clutch means operable to drivingly connect said first and second members and including a cage member movable transversely of the axis of rotation of the first and second members and relative thereto, drive transmitting elements located in said cage and between radially spaced drive surfaces of said first and second members and movabe upon movement of said cage, said drive transmitting elements having a first position out of driving cooperative engagement with said radially spaced surfaces and a second position in driving cooperative engagement with said radially spaced surfaces, yieldable means for holding said cage in a first position wherein said drive transmitting elements are in their said first position and including at least one detent roller member mounted in said cage and received in a recess in one of said radially spaced drive surfaces rotatable with one of said members and spring means biasing said detent roller into said recess and resisting movement thereof from said recess, and means for effecting movement of said cage to a second position wherein said drive transmitting elements are in their said second position in response to a predetermined speed of relative rotation between said first and second drive means overcoming said yieldable means.

7. A drive mechanism as defined in claim 6 wherein said roller detent has a roller stem and said spring means comprises a torsion spring member supported on said roller stem and having opposite portions engageable with diametrically opposite portions of said cage.

8. A drive mechanism comprising first and second members relatively rotatable about a common axis, clutch means operable to drivingly connect said first and second members and including a cage member movable transversely of the axis of rotation of said first and second members and relative thereto, drive transmitting elements located in said cage and between radially spaced drive surfaces rotatable with said first and second members and movable upon movement of said cage, said drive transmitting elements having a first position out of driving cooperative engagement with said radially spaced surfaces and a second position in driving cooperative engagement with said radially spaced surfaces, yieldable means for holding said cage in a first position wherein said drive transmitting elements are in their said first position including at least one detent pin slidably supported for radial movement in said cage and movable radially when said drive transmitting elements move to their said second position, one end of said detent pin being received in a detent notch in a member rotatable wtih one of said relatively rotatable members, said notch including a radially and circumferentially extending ramp surface sidably engageable with said detent pins and a spring means acting on the other end of said detent pin and biasing said pin into said detent notch, and means for effecting movement of said cage to a second position wherein said drive transmitting elements are in their said second position, said means for moving said cage operative to effect sliding of said detent pin relative to said ramp surface against the bias of said spring means.

9. A drive mechanism as defined in claim 8 wherein said detent pin and spring means are integrally connected.

10. A drive comprising a differential mechanism including driving and driven members, clutch means operatively associated with said driving and driven members and movable between a first disengaged position providing for rotation of said driving and driven members relative to each other and a second engaged position wherein said clutch means drivingly connects said members for rotation at a common speed, biasing means urging said clutch means toward said disengaged position, and actuating means operatively associated with said members and with said clutch means and operable to a predetermined speed of relative rotation between said members to move said clutch means to said second position for drivingly connecting said members, said actuating means including a member projecting from said clutch means and having a surface portion adjacent a surface on one of said driving and driven members.

11. A drive mechanism as defined in claim 10 wherein said actuating means includes fluid coupling means and said projecting member forms a part of said fluid coupling means.

12. A drive mechanism as defined in claim 11 wherein said fluid coupling means comprises a viscous shear fluid coupling having a first shear surface formed by said surface on said one of said driving and driven members and a second shear surface formed by said surface of said projecting member.

13. A drive mechanism as defined in claim 10 and wherein said clutch means includes a clutch element operatively associated with spaced surfaces on said driving and driven members respectively, and wherein said actuating means is operable to move said clutch element into engagement with each of said surfaces at said predetermined speed to drivingly connect said driving and driven members.

14. A drive mechanism as defined in claim 10 wherein said clutch means includes drive transmitting elements shiftable circumferentially relative to said driven member between said engaged and disengaged positions.

References Cited

UNITED STATES PATENTS 2,292,988  8/1942  Bloomfield et al. _____ 192—45
3,175,661  3/1965  Maurer et al. _____ 192—45.1

FOREIGN PATENTS 476,940  12/1937  Great Britain.

DAVID J. WILLIAMOWSKY, Primary Examiner.

L. H. GERIN, Assistant Examiner.

UNITED STATES PATENT OFFICE
CERTIFICATE OF CORRECTION

Patent No. 3,324,744  June 13, 1967

Daniel W. Roper

It is hereby certified that error appears in the above numbered patent requiring correction and that the said Letters Patent should read as corrected below.

Column 8, line 13, for "wtih" read -- with --; line 15, for "sidably" read -- slidably --; line 36, for "to" read -- at --.

Signed and sealed this 2nd day of January 1968.

(SEAL)
Attest:

Edward M. Fletcher, Jr.
Attesting Officer

EDWARD J. BRENNER
Commissioner of Patents